United States Patent [19]
Graham et al.

[11] Patent Number: 5,697,067
[45] Date of Patent: Dec. 9, 1997

US005697067A

[54] COMMUNICATION SYSTEM UTILIZING RADIATING TRANSMISSION LINE

[75] Inventors: Gerald Graham, Kleinburg; Paul William Liber, Scarborough, both of Canada

[73] Assignee: Mine Radio Systems Inc., Sunderland, Canada

[21] Appl. No.: 305,300

[22] Filed: Sep. 15, 1994

[51] Int. Cl.$^6$ .................. H04B 3/60; H04B 7/26
[52] U.S. Cl. .................. 455/55.1; 455/14; 455/54.1
[58] Field of Search .................. 455/14, 55.1, 105, 455/54.1; 379/55; 333/237; 375/256

[56] References Cited

U.S. PATENT DOCUMENTS

| | | | |
|---|---|---|---|
| 4,866,732 | 9/1989 | Carey et al. | 455/55.1 |
| 5,187,803 | 2/1993 | Sohner et al. | 455/14 |
| 5,432,838 | 7/1995 | Purchase et al. | 455/55.1 |

FOREIGN PATENT DOCUMENTS

| | | |
|---|---|---|
| 989013 | of 0000 | Canada . |
| 1248223 | of 0000 | United Kingdom . |
| 1491468 | of 0000 | United Kingdom . |
| 1497288 | of 0000 | United Kingdom . |
| 2057817 | of 0000 | United Kingdom . |
| 2057818 | of 0000 | United Kingdom . |
| 2073552 | of 0000 | United Kingdom . |

OTHER PUBLICATIONS

Harrington et al., Re-Radiation of Signals Employing Guided Antenna . . . Amplifier, IEEE pp. 312–320, Sep. 1988.

Chung, Underground Microcellular Communications Network, IEEE pp. 343–347, Aug. 1994.

Morgan, Michael A., and Sohner, Harold K., "A Radio Communications System for the English Channel Tunnel", in IEEE Transactions on Communication Technology, 1989, pp. 368 to 374.

*Primary Examiner*—Chi H. Pham
*Attorney, Agent, or Firm*—Riches, McKenzie & Herbert

[57] ABSTRACT

A radio frequency communication system utilizing a radiating transmission line for simultaneously communicating audio and video signals is disclosed. The video signals convey video information and the audio signals convey narrow band computer data or audio information. The communication system also provides several separate channels allowing simultaneous audio communication between a plurality of mobile stations. The communication system is intended to be used in environments where radio waves do not propagate well, such as in underground mines. The communication system comprises at least one amplification unit connected to the radiating transmission line for periodically amplifying the audio and video signals. The amplification units have a separate amplifier for amplifying each of the signals and each amplifier is connected to the transmission line in parallel. The amplifiers utilize transistors operating in the linear region. The amplifiers used to amplify the signal which is being radiated by the transmission line has a limiting circuit to attenuate the signal prior to amplification in order maintain the signal within the linear region of the amplifier.

19 Claims, 10 Drawing Sheets

COMMUNICATION SYSTEM UTILIZING RADIATING TRANSMISSION LINE

BACKGROUND OF THE INVENTION

This invention relates to radio frequency communication systems and in particular radio frequency communication systems utilizing radiating or "leaky" transmission lines. In a particular embodiment, the present invention relates to radio frequency communication systems used for underground communication.

Radiating transmission lines are deliberately constructed as imperfect transmission lines so that signals in the inner conductor radiate electromagnetic fields outwardly from the line as the electrical signals are being transmitted down the line. The electrical magnetic fields radiated from the line can be picked up by mobile receivers located remotely, but in the vicinity, of the line.

Radiating transmission lines can take on several different forms. One form comprises an open braid coaxial cable. Other forms comprise coaxial cables having cylindrical outer sheaths with longitudinal slits to permit radiation.

Radiating transmission lines are commonly used in environments where electromagnetic waves, such as radio frequency waves, do not propagate well. This type of environment exists in underground mine shafts. For example, a worker in a mine shaft using a remote mobile audio station, such as a walkie-talkie, can not communicate to other workers who also have remote mobile audio stations, because the radio waves cannot propagate long distances down a mine shaft. However, if all of the workers were near a radiating transmission line such that the radio waves from the first worker's audio station could be received by the transmission line, those signals could be transmitted down the line and radiated near the audio stations of other workers. In this way, communication in the mine shaft can be effected.

In the past, several different types of communication systems utilizing radiating transmission lines have been used. However, a common difficulty with all of the prior art communication systems has been intermodulation product interference caused by mixing of signals at different frequencies. Intermodulation interference is particularly prevalent in communication systems using radiating transmission lines because the transmitted signals must be sufficiently "strong" to radiate an appreciable distance from the line. These "strong" signals mix and the intermodulation products interfere with the weaker signals which are received by the transmission line from mobile stations.

Because of this intermodulation interference, prior art communication systems have been limited in the number of signals which can be transmitted down the line at any one time. Most prior art communication systems did not provide for multichannel communication where several mobile stations could communicate simultaneously and independently on the same transmission line.

In addition, in order to attempt to decrease the effects of intermodulation interference, prior art systems had a large spread between the frequencies of different signals to permit more effective filtering. However, this method of decreasing interference exhausts the usable frequencies of the transmission line thereby precluding additional signals from being transmitted. In particular, such prior art devices did not permit video signals from mobile video stations to be simultaneously transmitted on a single transmission line along with audio signals.

SUMMARY OF THE INVENTION

Accordingly, it is an object of this invention to at least partially overcome the disadvantages of the prior art. Also, it is an object of this invention to provide an alternative type of radio frequency communication system which provides for communication of audio and video signals on a single radiating transmission line. Also, it is an object of the present invention to provide a radio frequency communication system having multichannel audio communication. Furthermore, it is an object of the present invention to provide transmission of audio signals at frequencies less than 20 MHz apart.

Accordingly, in one of its aspects, this invention resides in providing a radio frequency communication system for communicating audio and video signals from and to remote mobile stations comprising:

a radiating transmission line;

a base station coupled to a first end of the radiating transmission line;

a first mobile audio station comprising mobile receiver means for receiving a first audio signal from the transmission line at a first frequency and mobile transmitter means for transmitting a second audio signal to the transmission line at a second frequency;

a mobile video station comprising mobile transmitter means for transmitting video signals to the transmission line at a third frequency;

wherein the base station comprises base receiver means for receiving signals near the second and third frequencies from the transmission line; and wherein the base station comprises base transmitter means for transmitting signals to the transmission line at the first frequency.

In a further aspect, the present invention resides in providing a radio frequency communication system for communicating audio signals between remote mobile audio stations and for communicating video signals from a remote mobile video station to a base station comprising:

a radiating transmission line having one end coupled to said base station;

at least one amplification means connected to the radiating transmission line for amplifying said audio and video signals;

wherein each of said mobile audio stations receives audio signals at different frequencies near a first frequency and transmits audio signals at different frequencies near a second frequency;

wherein each of said mobile video station transmits video signals at a third frequency;

wherein the base station comprises base receiver means for receiving the audio and video signals from the transmission line; and wherein the base station comprises base transmitter means for re-transmitting audio signals received by the base receiving means to the transmission line at the first frequency.

In a still further aspect, the present invention relates to a radio frequency communication system wherein the first and second amplifier means utilize transistor means operating in the linear region to amplify the signals.

Further aspects of the invention reside in providing an improved communication system having multichannel audio and data communication. In this way, a radio frequency communication system can provide for several independent audio communications between remotely located mobile audio stations and data communication to remotely control underground mining equipment by utilizing remotely located video stations to visually monitor the equipment.

Further aspects of the invention will become apparent upon reading the following detailed description and the drawings which illustrate the invention and preferred embodiments of the invention.

BRIEF DESCRIPTION OF THE DRAWINGS

In the drawings, which illustrate embodiments of the invention.

DETAILED DESCRIPTION OF PREFERRED EMBODIMENTS OF THE INVENTION

Figure 1:
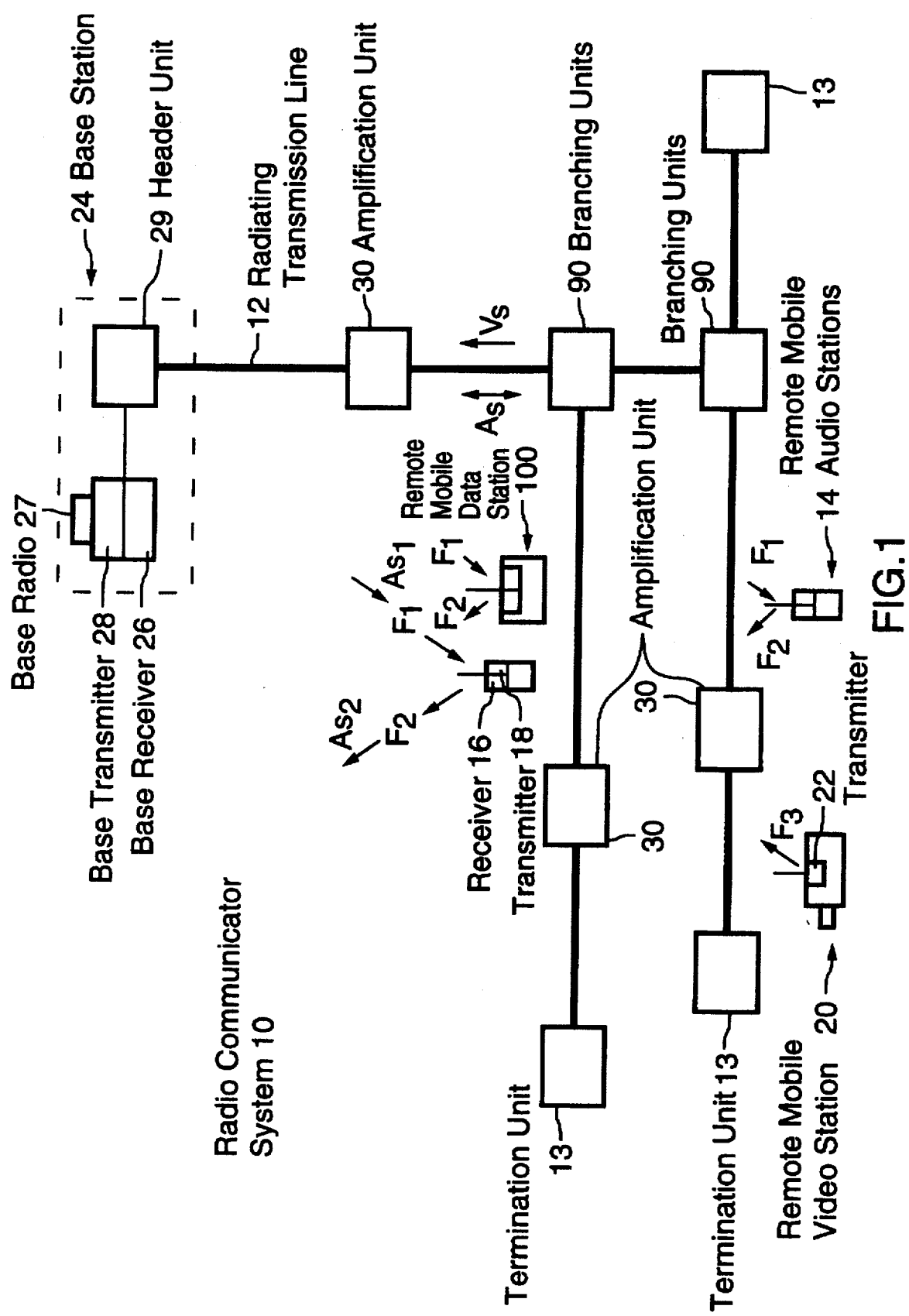
FIG. 1 shows one embodiment of a radio frequency communication system according to the present invention.

As shown in FIG. 1, one embodiment of the present invention comprises a radio frequency communication system, shown generally as 10. The communication system 10 comprises a radiating transmission line 12 used for communicating audio signals As and video signals Vs from remote mobile audio and video stations 14, 20. It is understood that several such remote mobile audio stations 14 can be located near the radiating transmission line 12.

For the purposes of the present description, it shall be assumed that the radio frequency communication system 10 is installed in an underground mine such that a substantial part of the radiating transmission line 12 is located below ground. For example it will be assumed that the vertical extension of the radiating transmission line 12 goes down a mine shaft and that each horizontal extension of the line 12 goes down a different level of the mine. However, it is understood that the system 10 could be used in any environment where radio waves do not propagate well.

The radiating transmission line 12 is of the type as discussed above wherein electromagnetic signals are both transmitted and radiated from the transmission line 12. In this way, remote mobile stations, such as remote mobile audio stations 14 and video stations 20, can transmit and/or receive radio frequency electromagnetic transmissions to and/or from the radiating transmission line 12.

Each mobile audio station 14 has a receiver 16 for receiving a first audio signal As1 at a first frequency F1 and a mobile transmitter 18 for transmitting a second audio signal As2 to the transmission line 12 at a second frequency F2. Accordingly, the audio signals As comprise the first audio signals As2 which travel from the mine to the surface and the second audio signals As1 which travel from the surface into the mine. The audio signals convey audio information but, in one embodiment, can also convey narrow band computer data. It is apparent that the first frequency F1 should be different from the second frequency F2.

The system 10 further comprises a remote mobile video station 20 having a mobile transmitter 22 for transmitting video signals Vs to the transmission line 12 at a third frequency F3. The remote mobile video station 20 can be any type of portable video camera having a built in transmitter for transmitting the video signals at a frequency. The video signals convey video information such as images sensed by the remote mobile video station 20.

One end of the transmission line 12 is coupled to a base station 24. It does not matter which end of the transmission 12 is coupled to the base station 24 as long as all of the amplification units 30 are oriented to amplify the first and second audio signals As1, As2 and the video signals Vs in the appropriate direction. However, in the embodiment where the communication system 10 is used in a mine, such that a substantial part of the line 12 is located below ground, it is preferable that the base station 24 is located above ground.

As shown in FIG. 1, the transmission line 12 is preferably coupled to the base station 24 by electrically connecting the line 12 to a part of the station 24. As shown in FIG. 1, this is preferably done by connecting the line 12 to a header unit 29 which can receive the transmission line 12 and Separate the first and second audio As1, As2 and the video signals Vs.

The base station 24 further comprises a base receiver 26 and a base transmitter 28. It is understood that the base receiver and transmitter 26, 28 can be directly coupled to the line 12 or can be indirectly coupled to the line 12 by means of the header unit 29 as shown in FIG. 1.

The base receiver 26 receives signals from the transmission line 12 at the second and third frequencies F2, F3. The base transmitter 28 can transmit signals to the transmission line at the first frequency F1. In this way, the second audio signal As2 can be received by the base receiver 26 and re-transmitted by the base transmitter 28 at the first frequency F1. This allows the second audio signals As2, which are transmitted by remote audio stations 14 to the base receiver 26, to be re-transmitted by the base transmitter 28 at the first frequency F1 and received by the receivers 16 of all other remote mobile audio stations 14 set at the first frequency F1. In this way, one mobile audio station 14 can communicate to all other mobile audio stations 14 which are set at the first frequency F1.

Furthermore, the base receiver 26 also receives the video signal Vs at the third frequency F3. This video signal can be reproduced on a video monitor or can be re-transmitted above the surface to other locations.

In a further embodiment, the system 10 comprises a base radio 27 located near the base station 24. The base radio 27 can receive or transmit audio signals to the base station 24 which are then received and re-transmitted down the line 12 by the transmitter means 28. The base radio 27 generally comprises a microphone into which persons on the surface can speak into. The audio signals transmitted by the base radio 27 are then modulated and transmitted at the first frequency F1 down the line 12 by the base transmitter 28. In this way, persons located on the surface of the mine can communicate with persons located underground. In a further embodiment, the base radio 27 can receive audio signals from other radios located on the surface, or be connected to telephone lines located on the surface, such that persons distant from the base station 24 can communicate with persons in the mine.

Standard radiating transmission lines 12 can usually radiate and transmit electromagnetic signals in a frequency range of 20 MHz to 500 MHz. However, in a preferred embodiment of the present invention, the first and second frequencies F1, F2 are above 100 MHz and preferably between 100 and 200 MHz. Furthermore, it is preferable that the third frequency F3 is below 100 MHz. This separation of the frequencies allows for easier separation and amplification of the first and second audio signals As1, As2 and the video signals Vs.

In a further preferred embodiment, the first frequency F1 is about 155 MHz and the second frequency F2 is about 170 MHz. In this way, both the first and second audio signals As1, As2 are in the VHS band. In this preferred embodiment it is also preferable that the third frequency F3 be between about 55 MHz and 68 MHz. It has been found that these frequencies interface well with standard walkie-talkies and transmitting portable video cameras.

The system 10 in a further embodiment comprises branching units 90 which permit the transmission line 12 to be "branched-off" in two different directions. In the case of a mine, the branching units 90 allow the transmission line 12 to extend down a shaft and horizontally along different levels.

Furthermore, the system 10 preferably comprises termination units 13 which are located at the end of each branch of the radiating transmission line 12. The termination units 13 comprise impedance-matching modules in order to terminate the transmission line 12 with a minimum amount of reflected signal.

An important element of one embodiment of the present invention is the amplification units 30. As seen in FIG. 1, the amplification units 30 are connected to the transmission line 12 at periodic locations. The amplification units 30 are used to amplify the audio and video signals As, Vs. Generally, one amplification unit 30 is placed along the line 12 at every 350 m. However, amplification units 30 may be required more frequently if other elements, such as branching units 90 interrupt the line 12 thereby increasing the signal loss.

Figure 2:
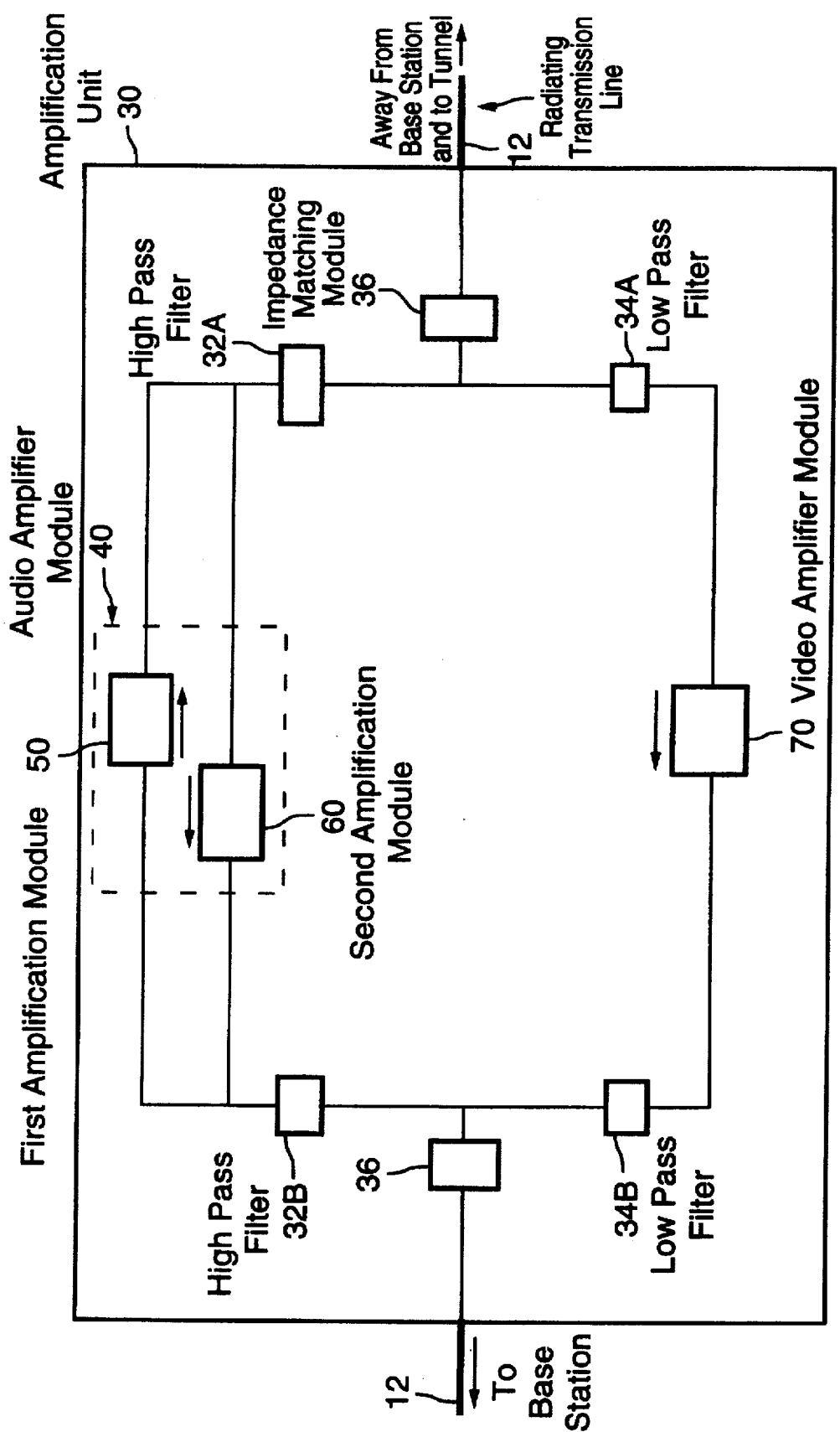
FIG. 2 is a block diagram showing the components of an amplification unit used in a radio frequency communication system according to the present invention.

The components of an amplification unit 30 are shown in more detail in FIG. 2. As can be seen, the radiating transmission line 12 enters and leaves a typical amplification unit 30 at either end. It is preferable to have impedance-matching modules 36 insulating the transmission line 12 from the components of the amplification unit 30.

The amplification unit 30 comprises an audio amplification module 40 and a video amplifier module 70. The audio amplification module 40 acts as an audio amplification means for amplifying the audio signals As. The video amplifier module 70 acts as a video amplification means for amplifying the video signals Vs. As can be seen from FIG. 2, the video amplifier module 70 is connected to the transmission line 12 in parallel with the audio amplification module 40.

As also shown in FIG. 2, there are first and second filtering means, shown as high pass filters 32A, 32B, connected between the audio amplification module 40 and the transmission line 12 on either side of the audio amplification module 40. The high pass filters 32A, 32B filter the video signal Vs from the audio amplification module 40.

It is understood that any type of filtering means could be used in order to remove the video signal Vs. However, as stated above, it is preferable that the frequencies used for the first and second audio signals As1, As2, are at higher frequencies than the frequency used for the video signal Vs. Accordingly, in a preferred embodiment, as shown in FIG. 2, the first and second filtering means for filtering video signals comprise high pass filters 32A, 32B for filtering signals below about 100 MHz.

Likewise, there are third and fourth filtering means, shown in FIG. 2 as low pass filters 34A and 34B, connected between the video amplifier module 70 and the transmission line 12 on either side of the video amplifier module 70. As was the case with high pass filters 32A, 32B, the third and fourth filtering means could be any type of filtering means to filter out the audio signal As from the video amplifier module 70. However, since in a preferred embodiment the video signal Vs is at a lower frequency than the audio signals As, the third and fourth filtering means preferably comprise low pass filters for filtering signals above about 100 MHz.

In a preferred embodiment, the video signal Vs is unidirectional in that it is only carried along the radiating transmission line 12 towards the base station 24. Accordingly, as shown in FIG. 2, the video amplifier module 70 amplifies the video signal Vs in a direction towards the base station 24 as indicated by the arrow located above the module 70.

As stated above, the audio signals As comprise a first audio signal As1, which is transmitted from the base station 24 further into the tunnel, and a second audio signal As2, which comprises signals traveling from the tunnel to the base station 24. To accommodate this bi-directional amplification, the audio amplification module 40 comprises a first amplification module 50 for amplifying the first audio signal As1 in a direction towards the tunnel and away from the base station 24 and a second amplification module 60 for amplifying the second audio signal As2 in a direction towards the base station 24. The first amplification module 50 and the second amplification module 60 are shown in more detail in FIGS. 3 and 4 respectively.

Figure 3:
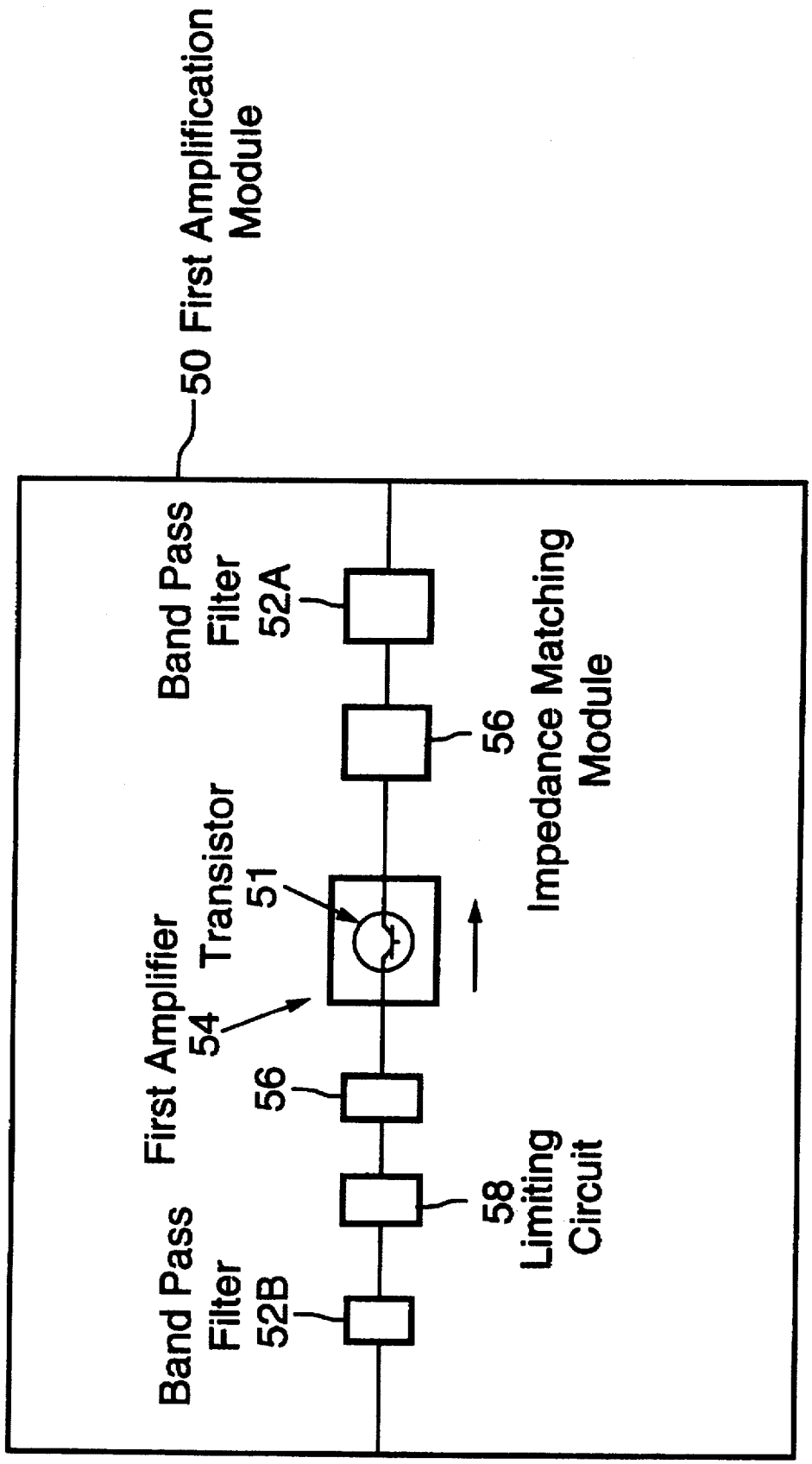
FIG. 3 is a block diagram showing the components of a first amplification module used for amplifying audio signals along the radiating transmission line in a direction away from the base station.

As shown in FIG. 3, the first amplification module 50 comprises a first amplifier 54 for amplifying the first audio signal As1 in the direction shown by the arrow. The first amplification module 50 further comprises fifth and sixth filtering means, shown in FIG. 3 as band pass filters 52A, 52B, for passing signals at frequencies near the first frequency F1 only and filtering out signals that are not at frequencies near the first frequency F1. The band pass filters 52A, 52B, are connected on either side of the first amplifier 54 and, if FIG. 3 is superimposed on FIG. 2, it is apparent that the band pass filters 52A, 52B are connected between the first amplifier 54 and the high pass filters 32A, 32B, respectively.

The first amplification module 50 further comprises a limiting circuit 58 for attenuating the signal entering the first amplifier 54. The limiting circuit 58 is generally required to limit the first audio signal As1. The first audio signal As1 must be sufficiently strong so that it can radiate from the transmission line 12, however, if the first audio signal As1 is too strong, then the signal As1 will not be properly amplified by the first amplifier 54. The limiting circuit 58 ensures that the first audio signal As1 does not exceed the amplification specifications of the first amplifier 54.

In a preferred embodiment, the first amplifier 54 utilizes a transistor 51 for amplifying the first audio signal As1.

Because the transistor 51 has an impedance which is generally lower than the impedance of the other components in the system 10, it is preferable to have impedance-matching modules 56 located on either side of the first amplifier 54 to match the impedance of the first amplifier 54 with the other components in the system 10.

Figure 4:
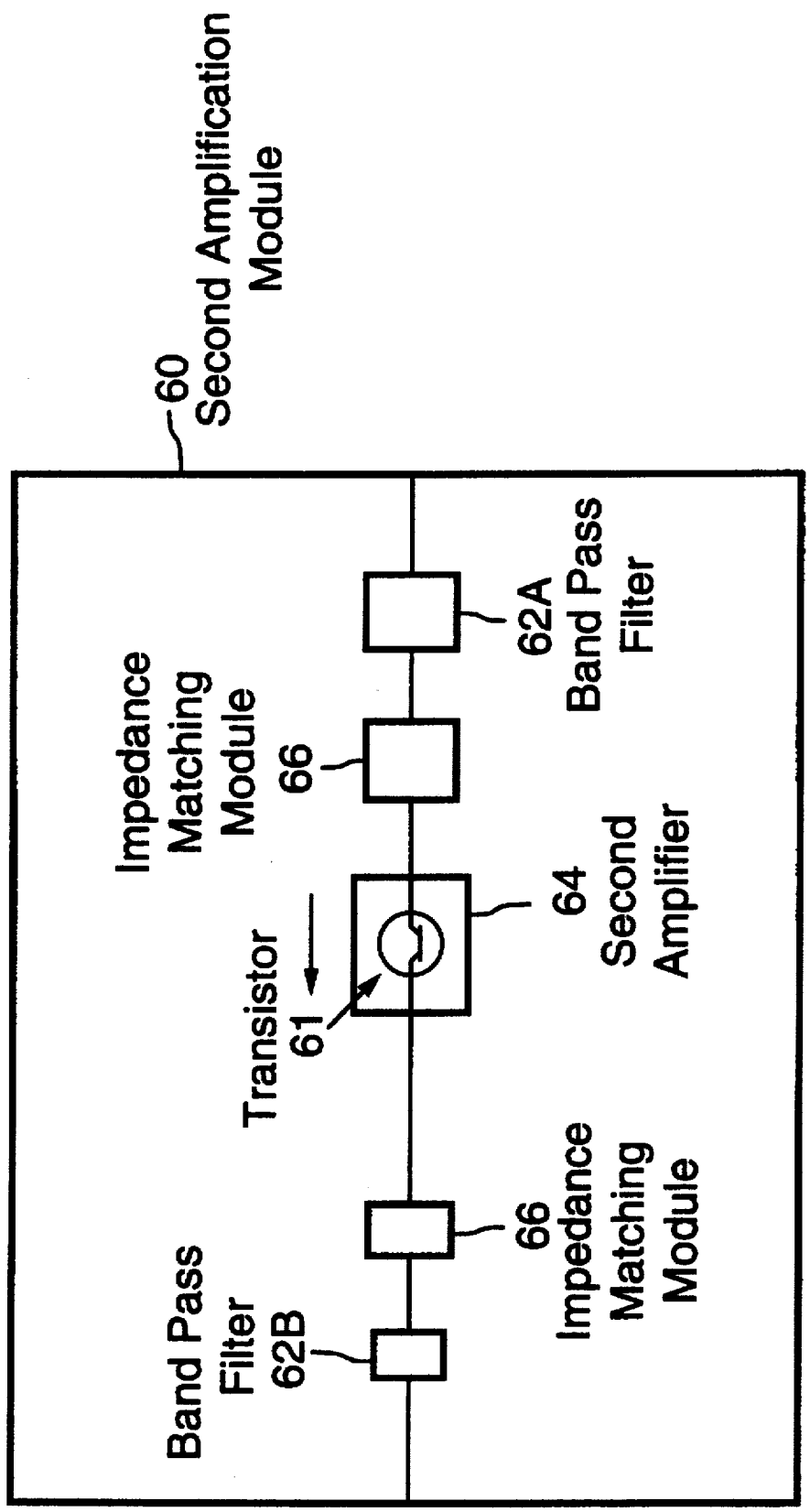
FIG. 4 is a block diagram showing the components of a second amplification module for amplifying audio signals along the transmission line in a direction towards the base station.

The second amplification module 60 is shown in FIG. 4. As with the first amplification module 50, second amplification module 60 comprises a second amplifier 64 for amplifying the second audio signal As2 in a direction towards the base station 24, as shown by the arrow in FIG. 4.

The second amplification module 60 also comprises seventh and eighth filtering means, shown in FIG. 4 as band pass filters 62A, 62B for passing signals at frequencies near the second frequency F2 and for filtering out signals at frequencies not near the second frequency F2. The band pass filters 62A, 62B are connected between the second amplifier 64 and the high band pass filters 32A, 32B respectively. It is understood that the band pass filters 62A, 62B can take on any form which can accomplish this result. In a further preferred embodiment, the band pass filters 62A, 62B comprise shorts to ground for signals at specific frequencies, such as the first frequency F1. This is often preferable because the first signal As1 at the first frequency F1 is much stronger.

Furthermore, if FIGS. 2, 3 and 4 are combined, it is apparent that the second amplification module 60 is connected between the high pass filters 32A, 32B in parallel with the first amplification module 50.

As with the first amplifier 54, the second amplifier 64, in a preferred embodiment, utilizes a transistor 61 for amplifying the second audio signal As2. Furthermore, the second amplification module 60 comprises impedance-matching modules 66 for performing a similar function as impedance-matching modules 56 in FIG. 3.

As the second audio signal As2 is generally received by the radiating transmission line 12 from remote mobile audio stations 14, the second audio signal As2 is generally not very strong in the transmission line 12. Accordingly, a limiting circuit 58 is generally not required in the second amplification module 60.

Figure 5:
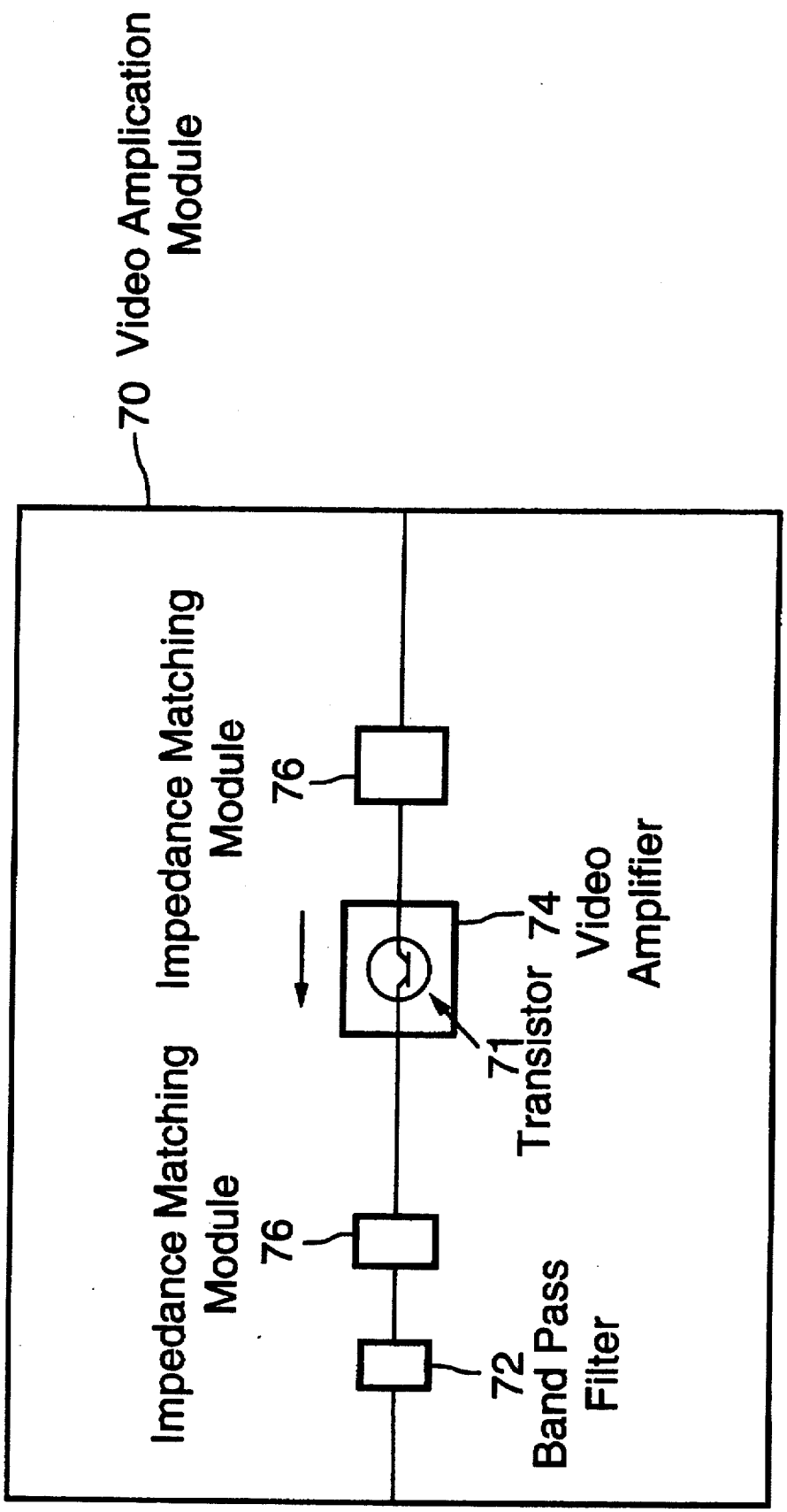
FIG. 5 is a block diagram showing a video amplifier module for amplifying video signals along the transmission line in a direction towards the base station.

FIG. 5 shows the video amplification module 70 in more detail. The video amplification module 70 comprises a video amplifier 74 for amplifying the video signal Vs in a direction towards the base station 24, as shown by the arrow in FIG. 5.

The video amplification module preferably comprises a band pass filter 72 for passing signals at frequencies near the third frequency F3 and for filtering out signals at frequencies not near the third frequency F3. The band pass filter 72 is connected between the video amplifier 74 and the low pass filter 34B. It is understood that the band pass filter 72 can take on any form which can accomplish this result. In a further preferred embodiment, the band pass filter 72 comprises circuits to ground signals at specific frequencies, such as the first frequency F1. This is often preferable because the first signal As1 at the first frequency F1 is much stronger.

As with the first and second amplification modules 50 and 60, the video amplification module preferably comprises impedance matching modules 76 for performing a similar function as impedance modules 56 and 66 in FIGS. 3 and 4 respectively. Furthermore, in a preferred embodiment, the video amplifier 74 utilizes a transistor 71 for amplifying the video signal Vs.

Figure 6A:
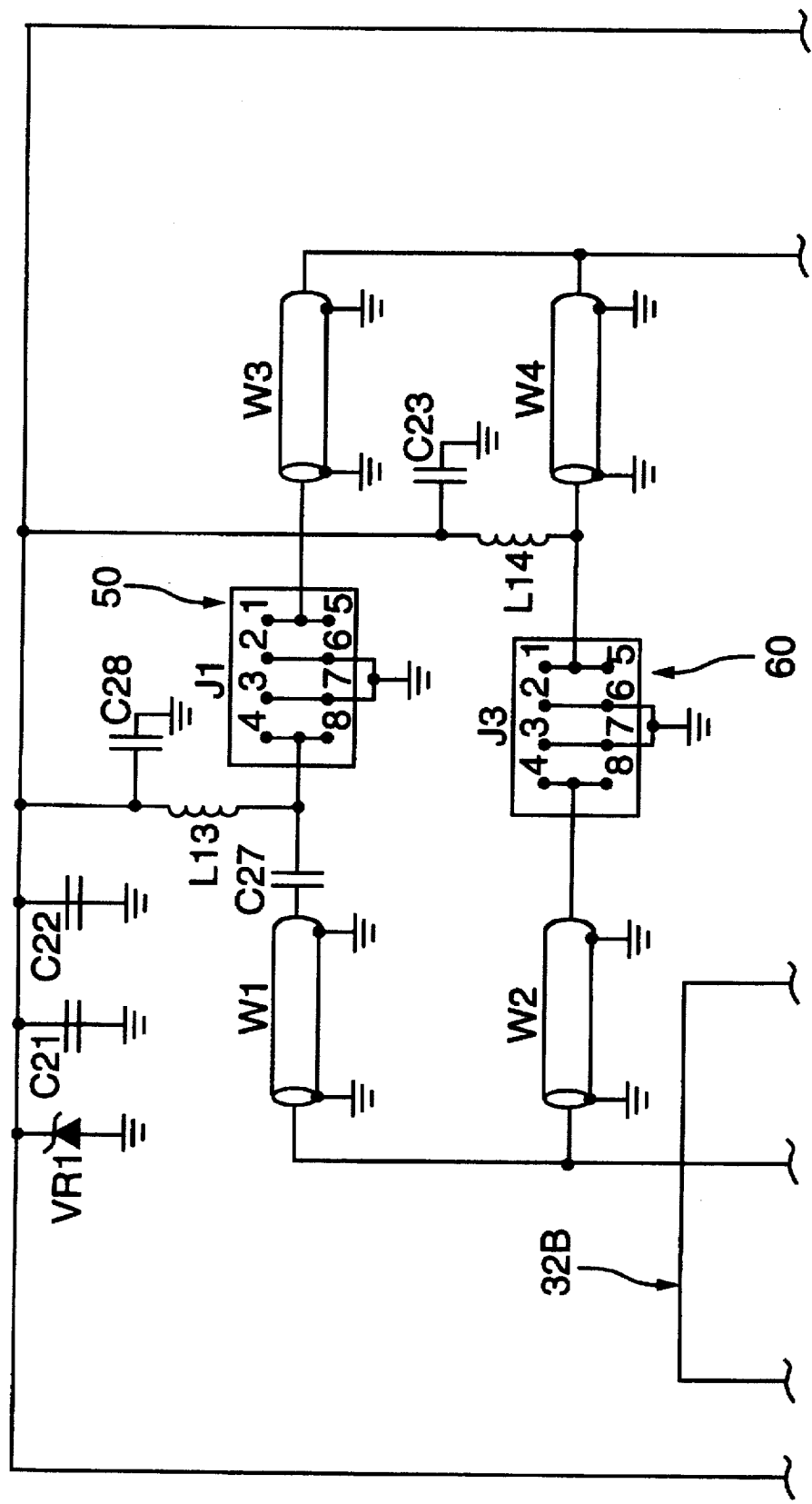
FIG. 6 is an electrical schematic diagram of the amplification unit according to a preferred embodiment of the present invention.
Figure 6B:
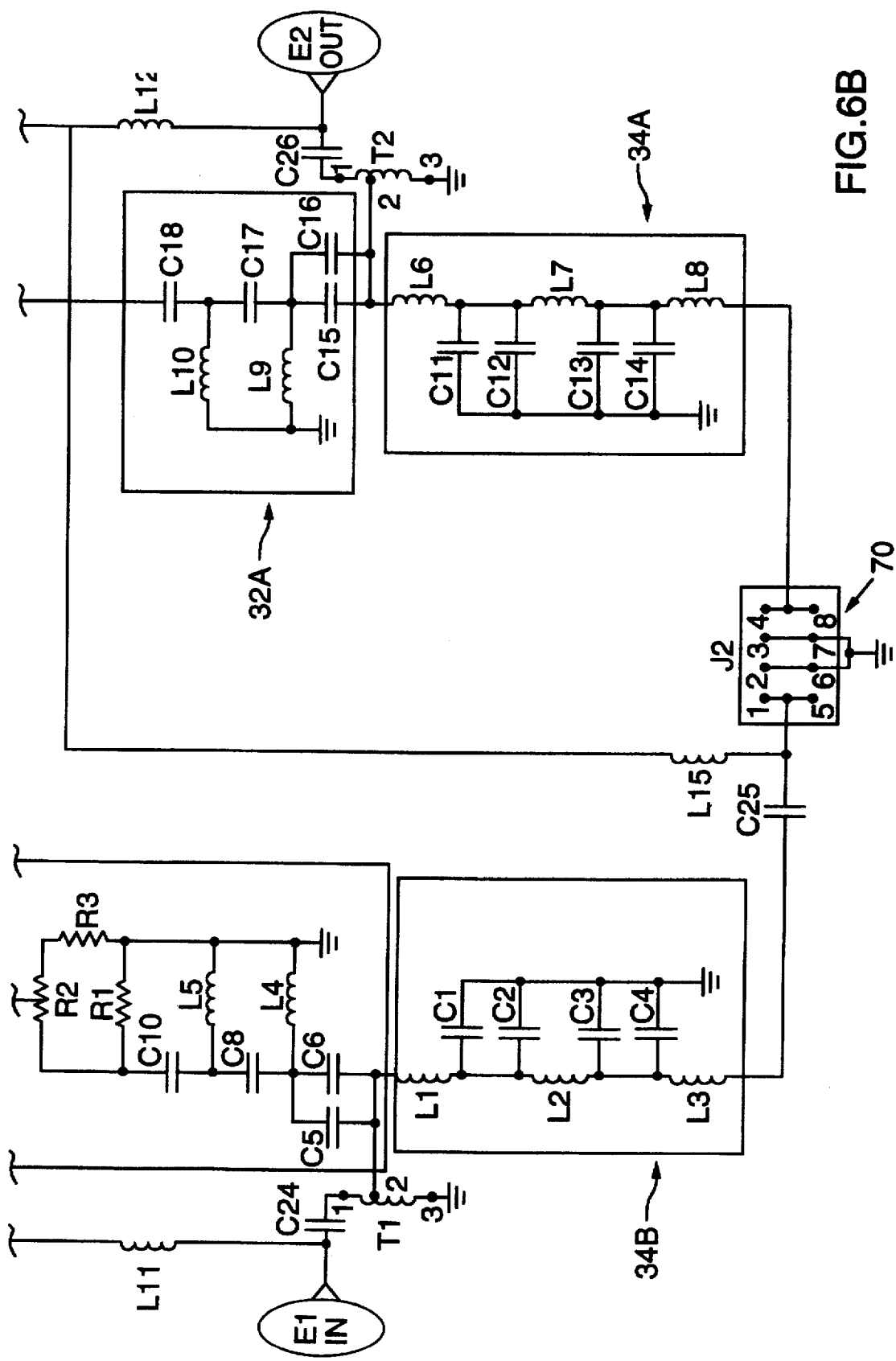

FIG. 6 shows an electrical schematic diagram of the amplification unit 30 according to a preferred embodiment of the present invention. A preferred arrangement of electrical components is shown in FIG. 6 for forming high pass filters 32A, 32B and low pass filters 34A, 34B. However, it is understood that any combination of capacitors, inductors and resistors could be used to form high pass filters 32A, 32B and low pass filters 34A, 34B. It is apparent that the relative values of these components would depend on the frequencies used and the precise operating characteristics of the transistors 51, 61.

Transformers T1, T2 act as the impedance-matching modules 36 in order to match the impedance of the amplification unit 30 with that of the remainder of the communication system 10. Connectors J1, J2 and J3 are used for connecting the first amplification module 50, video amplifier module 70 and second amplification module 60, respectively.

Wave guides W1, W2, W3 and W4 located on either side of connectors J1 and J3 are present to decrease noise in a manner known to persons skilled in the art. The length of wave guides W1, W2, W3 and W4 is preferably about a quarter of the wave length of the audio signals As.

Inductors L11, L12, L13, L14 and L15 are used to provide DC power from the radiating transmission line to the active components of the communication system 10, such as the transistors 51, 61.

Figure 7:
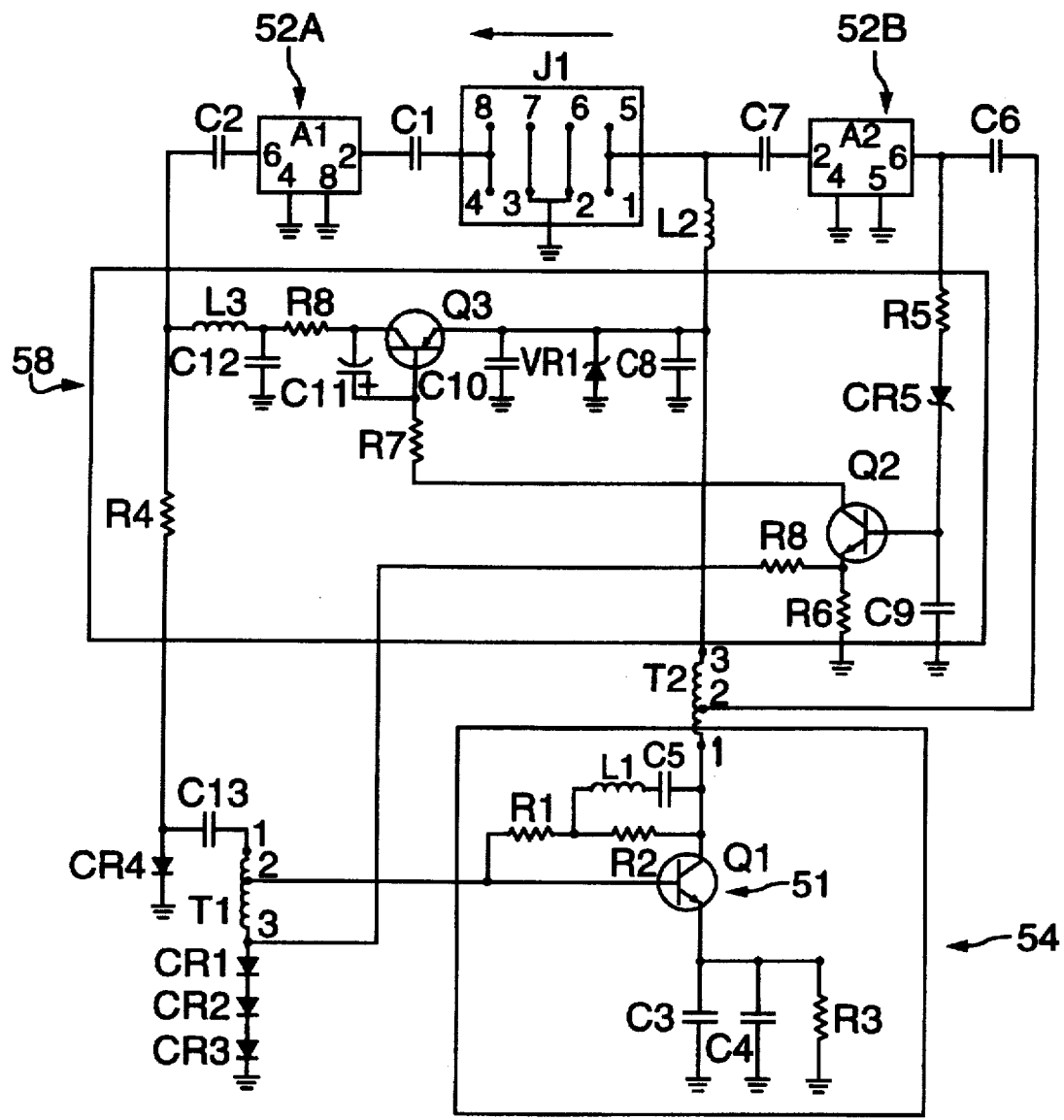
FIG. 7 is an electrical schematic diagram of the first amplification module according to a preferred embodiment of the present invention.

FIG. 7 shows an electrical schematic diagram of the first audio communication module 50 according to a preferred embodiment of the present invention. Connector J1 shown in FIG. 7 connects the first amplification module 50 to the connector J1 located on the amplification unit 30 as shown in FIG. 6. Unit blocks A1 and A2 shown on either side of connector J1 are filter assemblies and correspond to band pass filters 52A, 52B as shown in FIG. 3. Transformers T1 and T2 correspond to the impedance-matching modules 56 shown in FIG. 3.

Limiting circuit 58 comprises transistors Q2 and Q3, and in association with the other electrical components as shown in FIG. 7, can limit the first audio signal As1 entering the first amplifier 54. Transistor Q1 corresponds to transistor 51 in FIG. 3 and, in combination with the associated electrical components as shown in FIG. 7, form the first amplifier 54.

It is understood that the circuits shown in FIG. 7 are preferred embodiments of the limiting circuit 58 and first amplifier 54 and that other specific circuits could be used without derogating from the scope of the present invention. It is also apparent that the actual values of the inductors, resistors and capacitors shown in FIG. 7 are dependent on the frequencies of the signals As1, As2 and the characteristics of transistors Q1, Q2 and Q3.

Figure 8:
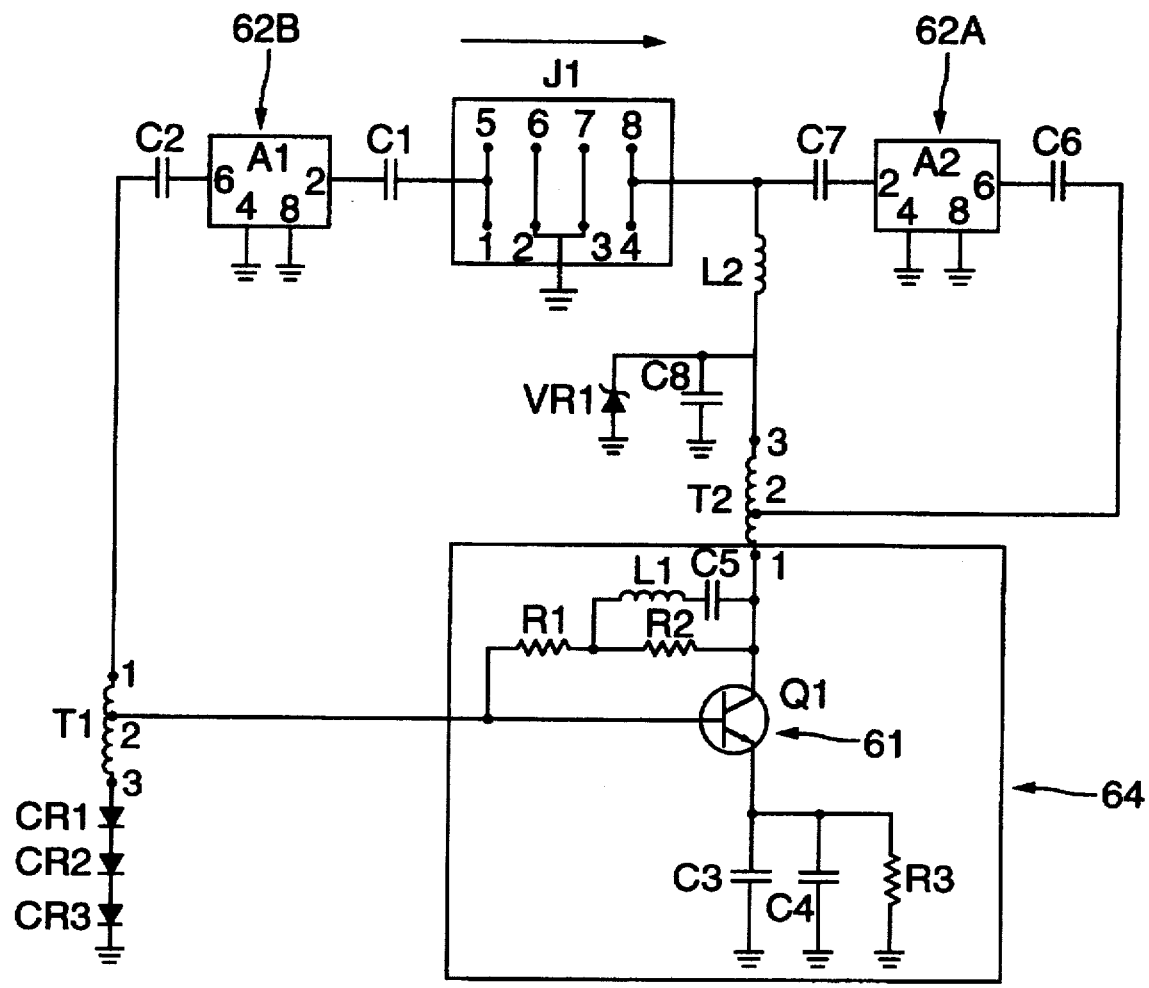
FIG. 8 is an electrical schematic diagram of the second amplification module according to a preferred embodiment of the present invention.

FIG. 8 shows the electrical schematic diagram of the second amplifier module 60 according to a preferred embodiment of the present invention. Connector J1 in FIG. 8 connects with connector J3 in FIG. 6.

Blocks A1 and A2 in FIG. 8 are band pass filters for passing signals having frequencies near the second frequency F2 and filtering signals not having frequencies near frequency F2 and in particular filtering signals having frequencies near frequency F1. Blocks A1 and A2 correspond to band pass filters 62A, 62B in FIG. 4. Transformers T1 and T2 act as impedance-matching modules, shown in FIG. 4 as 66, to match the impedance of the transistor Q1 in FIG. 8 to the impedance of the communication system 10.

Transistor Q1 performs the amplification of the second signal As2 in a direction towards the base station 24 and corresponds to transistor 61 in FIG. 4. The capacitors, inductors and resistors connected to transistor Q1 maintain transistor Q1 in the linear region with an appropriate gain.

The values for these electrical components can be determined by persons skilled in the art to effect the proper gain for signals having frequencies near the second frequency F2. Transistor Q1 and the associated electrical components form part of the second amplifier, shown in FIG. 4 as 64.

Figure 9:
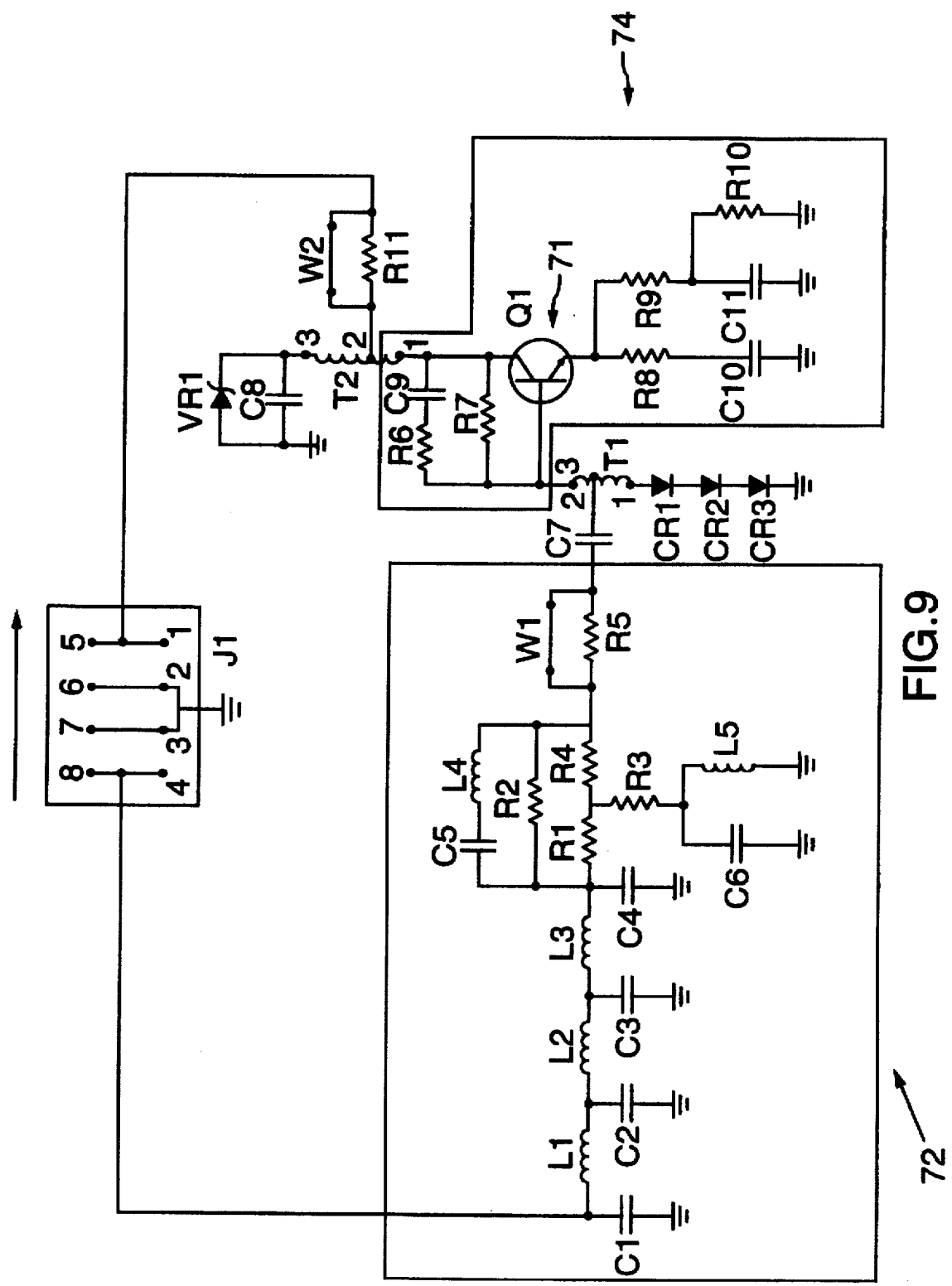
FIG. 9 is an electrical schematic diagram of the video amplifier module according to a preferred embodiment of the present invention.

FIG. 9 shows an electrical schematic diagram of a video amplifier module 70 corresponding to a preferred embodiment of the invention. Connector J1 in FIG. 9 connects with connector J2 in FIG. 6.

Band pass filter 72 as shown in FIG. 9 as comprising a series of inductors, capacitors and resistors for passing the amplified video signal Vs from the video amplifier 74 and for filtering out signals having frequencies not near the third frequency F3. Transformers T1 and T2 act as impedance matching modules, shown in FIG. 5 as 76, to match the impedance of the transistor T1 in FIG. 9 to the impedance of the communication system 10.

As shown in FIG. 9, the video amplification module 70 comprises a video amplifier 74 which utilizes transistor Q1 to perform the amplification of the video signal Vs in a direction towards the base station 24. The transistor Q1 in FIG. 9 corresponds to transistor 71 in FIG. 5. The capacitors, conductors and resistors connected to transistor Q1 in FIG. 9 maintain transistor Q1 in the linear region and within an appropriate gain. The values of these electrical components can be determined by persons skilled in the art to effect the proper gain for signals having frequencies in the third frequency F3.

In a further preferred embodiment of the present invention, the communication system 10 comprises several mobile audio stations 14. Each audio station 14 has a mobile transmitter 18 for transmitting signals at separate frequencies near the second frequency F2. Furthermore, each mobile audio station has a mobile receiver 16 for receiving signals at separate frequencies near the first frequency F1.

In this embodiment, several mobile audio stations 14 can transmit and receive audio signals As simultaneously to and from the transmission line 12. In this way, several different audio signals As can be transmitted and received from all of the mobile audio units 14. In other words, this preferred communication system 10 provides "multichannel" communication between different mobile audio stations 14.

In this embodiment, the base receiver can independently separate and receive each of these signals at frequencies near the second frequency F2. These signals are then re-transmitted at frequencies near the first frequency F1, by the base transmitter 28.

Multichannel communication can be effected by operating transistors 51, 61, which form part of first and second amplifiers 54, 64, in the linear regions. The circuit diagrams shown in FIGS. 7 and 8 are designed to operate transistors 51, 61 (shown in FIGS. 7 and 8 as Q1) in the linear class A region.

It is understood that any spread of the frequencies near the first and second frequencies F1, F2, can be used as long as no frequencies near the first frequency F1 overlap with frequencies near the second frequency F2. However, it is preferable if the spread of all of the signals near the first and second frequencies F1 and F2 be about 1 MHz.

Having a 1 MHz spread permits about 10 to 20 channels to be transmitted on the radiating transmission line 12 at any one time, whether or not a separate video signal Vs is also being transmitted from a mobile video station 20. The band width for each audio signal channel can be about 6 KHz, 12.5 KHz, 25 KHz or 35 KHz, or any combination thereof. Furthermore, having all of the frequencies transmitted and received from the audio stations 14 within 1 MHz of the second and first frequencies F2, F1, respectively, ensures that transistors 51, 61 will operate in the linear region for all of the frequencies. In addition, having a spread of about 1 MHz allows the band pass filters, shown in FIGS. 3 and 4 as 52A, 52B, 62A, 62B, to be more precise thereby filtering out more noise.

It is understood that the audio signals As transmitted on each of the channels, can also consist of computer data much as a modem can transmit computer data over telephone lines. In this way, communication system 10 uses mobile data stations 100 for receiving and sending computer data along the transmission line 12. The data can be transmitted as digital or analog data points.

Accordingly, the communication system 10 of the present invention permits a data signal to be sent and received from the base station 24 located above ground. This data signal can be used to control machinery as well as ventilation and other environmental controls in the mine. Furthermore, the operation of machinery under ground can be monitored by persons above ground by use of the mobile video station 20. In this way, the present communication system 10 can be used to monitor and control underground mining equipment remotely from the surface with fewer workers located below ground. Therefore, the communication system 10 according to the present invention provides for mines to be operated much more cheaply and safely.

Furthermore, the present system can increase the level of safety in the mine. For example, the data signals can be used to periodically or continuously locate the personnel in the mine. In this way, should an accident occur in a mine, there will be a record of the most recent number of personnel in the mine, and their location in the mine, to assist any rescue operations which are launched. Furthermore, more dangerous mining operations, such as triggering explosives, can be done remotely and with the maximum number of personnel outside of the mine by use of a data signal.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A radio frequency communication system for communicating audio and video signals fro and to remote mobile stations comprising:

a radiating transmission line;

a base station coupled to a first end of the radiating transmission line;

a first mobile audio station comprising mobile receiver means for receiving a first audio signal from the transmission line at a first frequency and mobile transmitter means for transmitting a second audio signal to the transmission line at a second frequency;

a mobile video station comprising mobile transmitter means for transmitting video signals to the transmission line at a third frequency;

at least one amplification means wherein each such amplification means is connected to said transmission line at periodic locations for amplifying the audio signals and video signals, said amplification means comprising:

audio amplification means for amplifying said audio signals;

first and second filtering means connected between said audio amplification means and said transmission line for filtering said video signal;

video amplifier means for amplifying said video signal in a direction toward the base station;

third and fourth filtering means connected between said video amplifier means and said transmission line for filtering said first and second audio signals;

wherein said first filtering means, audio amplification means and second filtering means are connected to said transmission line in parallel with said third filtering means, video amplifier means and fourth filtering means;

wherein the base station comprises base receiver means for receiving signals near the second and third frequencies from the transmission line; and wherein the base station comprises base transmitter means for transmitting signal to the transmission line at the first frequency.

2. A radio frequency communication system as defined in claim 1 wherein said audio amplification means comprises:

first amplifier means for amplifying said first signal in a direction away from the base station;

fifth and sixth filtering means for passing signals near said first frequency connected between said first amplifier means and said first and second filtering means, respectively;

second amplifier means for amplifying said second signal in a direction toward the base station;

seventh and eighth filtering means for passing signals near said second frequency connected between said second amplifier means and said first and second filtering means, respectively; and wherein said fifth filtering means, first amplifier means and sixth filtering means are connected to said first and second filtering means in parallel with said seventh filtering means, second amplifier means and eighth filtering means.

3. A radio frequency communication system as defined in claim 2 wherein each of the first and second amplifier means and the video amplifier means utilize transistor means to amplify said audio and video signals and wherein said audio amplification means comprises limiting circuit means for attenuating said first signal prior to amplification by said first amplification means.

4. A radio frequency communication system as defined in claim 3 wherein a substantial part of the radiating transmission line is located below ground.

5. A radio frequency communication system as defined in claim 4 wherein the base station is located above ground.

6. A radio frequency communication system as defined in claim 5 wherein said first and second frequencies are between about 100 MHz and about 200 MHz and wherein the third frequency is below about 100 MHz.

7. A radio frequency communication system as defined in claim 6 wherein the first frequency is about 155 MHz, the second frequency is about 170 MHz and the third frequency is between about 55 MHz and about 68 MHz.

8. A radio frequency communication system as defined in claim 3 further comprising:

a second mobile audio station having mobile receiver means for receiving a signal at the first frequency from the transmission line; and wherein when the first mobile audio station transmits the second audio signal at the second frequency, the base receiver means receives the second signal and the base transmitter means retransmits the first signal at the first frequency corresponding to the second signal such that audio signals can be communicated from the first audio station to the second audio station.

9. A radio frequency communication system as defined in claim 2 comprising additional mobile audio stations in addition to the first mobile audio station;.

wherein each additional mobile audio station has a mobile transmitter means for transmitting an audio signal at a frequency near the second frequency but different from the other frequencies;

wherein the audio signals transmitted by each of the mobile stations are received by a base receiver means and re-transmitted by a base transmitter means to the transmission line at a frequency near the first frequency but different from the other frequencies;

wherein each additional mobile audio station has mobile receiver means for receiving audio signals at separate frequencies near the second frequency;

wherein more than one mobile audio station can simultaneously transmit audio signals to the transmission line and said audio signals can be simultaneously received by other mobile audio stations.

10. A radio frequency communication system as defined in claim 9 wherein the first and second amplifier means utilize transistor means operating in the linear region to amplify the signals.

11. A radio frequency communication system as defined in claim 10 wherein the signals transmitted by each additional mobile audio unit are at frequencies within about 1 MHz of the second frequency.

12. A radio frequency communication system as defined in claim 1 wherein the signals received by each additional mobile audio unit are at frequencies within about 1 MHz of the first frequency.

13. A radio frequency communication system as defined in claim 3 further comprising a mobile data station for transmitting and receiving computer data to and from the transmission line.

14. A radio frequency communication system as defined in claim 3 wherein the base transmitter means transmits signals at the first frequency corresponding to audio signals transmitted from a base radio located near the base station.

15. A radio frequency communication system for communicating audio signals between remote mobile audio stations and for communicating video signals from a remote mobile video station to a base station comprising:

a radiating transmission line having one end coupled to said base station;

at least one amplification means connected to the radiating transmission line for amplifying said audio and video signals;

wherein each of said mobile audio stations receives audio signals at different frequencies near a first frequency and transmits audio signals at different frequencies near a second frequency;

wherein each of said mobile video station transmits video signals at a third frequency;

wherein the base station comprises base receiver means for receiving the audio and video signals from the transmission line; and wherein the base station comprises base transmitter means for re-transmitting audio signals received by the base receiving means to the transmission line at the first frequency.

16. A radio frequency communication system as defined in claim 15 wherein the first frequency and the second frequency are above about 100 MHz and wherein the third frequency is below about 90 MHz.

17. A radio frequency communication system as defined in claim 16 wherein each amplification means comprises:

audio amplification means for amplifying said audio signals;

first and second filtering means connected between said audio amplification means and said transmission line for filtering said video signals;

video amplifier means for amplifying said video signal in a direction toward the base station;

third and fourth filtering means connected between said video amplifier means and said transmission line for filtering said audio signals;

wherein said first filtering means, audio amplification means and second filtering means are connected to said transmission line in parallel with said third filtering means, video amplifier means and fourth filtering means.

18. A radio frequency communication system as defined in claim 17 wherein said audio amplification means comprises:

first amplifier means for amplifying the audio signals at the first frequency in a direction away from the base station;

limiting circuit means for attenuating the audio signal near the first frequency prior to amplification by the first amplifier means;

fifth and sixth filtering means for passing signals near said first frequency connected between said first amplifier means and said first and second filtering means, respectively;

second amplifier means for amplifying the audio signals at the second frequency in a direction toward the base station;

seventh and eighth filtering means for passing signals near the second frequency connected between said second amplifier means and said first and second filtering means, respectively; and wherein said fifth filtering means, first amplifier means and sixth filtering means are connected to said first and second filtering means in parallel with said seventh filtering means, second amplifier means and eighth filtering means.

19. A radio frequency communication system as defined in claim 18 wherein the first and second amplifier means utilize transistor means operating in the linear region to amplify the signals.

* * * * *